United States Patent
Co et al.

(10) Patent No.: US 8,626,638 B2
(45) Date of Patent: Jan. 7, 2014

(54) SYSTEMS AND METHODS FOR USING DECLINING BALANCE METHODOLOGIES TO ENHANCE CLEARING OF DIVIDEND FUTURES AND OTHER INSTRUMENTS

(75) Inventors: Richard Co, Chicago, IL (US); TuenTuen Wang, Chicago, IL (US); Xing Su, Chicago, IL (US); John Labuszewski, Westmont, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 104 days.

(21) Appl. No.: 12/955,464

(22) Filed: Nov. 29, 2010

(65) Prior Publication Data

US 2012/0136770 A1    May 31, 2012

(51) Int. Cl.
*G06Q 40/02*    (2012.01)

(52) U.S. Cl.
USPC .................................. 705/37; 705/35; 705/39

(58) Field of Classification Search
USPC ............................................... 705/35, 39, 37
See application file for complete search history.

(56) References Cited

U.S. PATENT DOCUMENTS

| | | | |
|---|---|---|---|
| 7,308,427 B1 * | 12/2007 | Hood | 705/35 |
| 7,835,959 B1 | 11/2010 | Redweik | |
| 7,844,515 B1 * | 11/2010 | Redweik | 705/35 |
| 2003/0233324 A1 | 12/2003 | Hammour et al. | |
| 2006/0253355 A1 | 11/2006 | Shalen | |
| 2008/0249955 A1 | 10/2008 | Friedberg | |
| 2010/0299238 A1 | 11/2010 | Hecht | |

OTHER PUBLICATIONS

WebWire®, Eurex to enhance successful index dividend future contract, Apr. 22, 2009, WebWire® 1995-2010, 1 page.
Hedgeweek, Published on Hedgweek (http://www.hedgeweek.com) FTSE 100 Dividend Index futures reach one million milestone by Emily Perryman, Created Mar. 25, 2010, Source URL: http://www.hedgweek.com/2010/03/25/40434/ftse-100-divident-index-futures-reach-one-milion-milestone, 1 page.
FTSE 100 Dividend Index Futures, Jun. 2010, NYSE Liffe's standard, cash-settled futures contrast based on the FTSE 100 Dividend Index., www.nyx.com, © 2010 NYSE Euronext, 1 page.
Introduction to Weather Derivatives by Felix Carabello, Associate Director, Environmental Products, Chicago Mercantile Exchange, Copyright © 2010 Investopedia ULC, 4 pages.
PCT International Search Report mailed Apr. 2, 2012, PCT/US 11/61919, 19 pages.

* cited by examiner

*Primary Examiner* — Jagdish Patel
(74) *Attorney, Agent, or Firm* — Banner & Witcoff, Ltd.

(57) ABSTRACT

Systems and method are disclosed for quoting, adjusting and settling futures contracts by successively removing the just-realized variables from the quoted futures price to focus the quoted contract value to the remaining unrealized economic variables. Further, such systems and method for quoting, adjusting and settling the futures contracts preserve the underlying economic consideration for the trade when compared with the traditional way of quoting futures based on the same cumulative sum.

20 Claims, 6 Drawing Sheets

| | Index Value | Short Pays Dividend to Long | Daily MTM | Net | | Index Value | Short Pays Dividend to Long | Daily MTM | Net |
|---|---|---|---|---|---|---|---|---|---|
| 502 — 9/21/09 | 6.42 | | | | 11/5/09 | 4.15 | 0.12 | -0.12 | 0.00 |
| 9/22/09 | 6.39 | 0.03 | -0.03 | 0.00 | 11/6/09 | 4.01 | 0.14 | -0.14 | 0.00 |
| 9/23/09 | 6.38 | 0.01 | -0.01 | 0.00 | 11/9/09 | 3.74 | 0.27 | -0.27 | 0.00 |
| 9/24/09 | 6.24 | 0.14 | -0.14 | 0.00 | 11/10/09 | 3.46 | 0.28 | -0.28 | 0.00 |
| 9/25/09 | 6.24 | 0.00 | 0.00 | 0.00 | 11/11/09 | 3.46 | 0.00 | 0.00 | 0.00 |
| ... | | | | | ... | | | | |
| 10/9/09 | 5.25 | 0.03 | -0.03 | 0.00 | 11/25/09 | 2.32 | 0.15 | -0.15 | 0.00 |
| 10/12/09 | 5.25 | 0.00 | 0.00 | 0.00 | 11/27/09 | 2.06 | 0.26 | -0.26 | 0.00 |
| 10/13/09 | 5.18 | 0.07 | -0.07 | 0.00 | 11/30/09 | 1.95 | 0.11 | -0.11 | 0.00 |
| 10/14/09 | 5.14 | 0.04 | -0.04 | 0.00 | 12/1/09 | 1.90 | 0.05 | -0.05 | 0.00 |
| 10/15/09 | 5.14 | 0.00 | 0.00 | 0.00 | 12/2/09 | 1.75 | 0.15 | -0.15 | 0.00 |
| 10/16/09 | 5.14 | 0.00 | 0.00 | 0.00 | 12/3/09 | 1.71 | 0.04 | -0.04 | 0.00 |
| 10/19/09 | 5.14 | 0.00 | 0.00 | 0.00 | 12/4/09 | 1.70 | 0.01 | -0.01 | 0.00 |
| 10/20/09 | 5.12 | 0.02 | -0.02 | 0.00 | 12/7/09 | 1.66 | 0.04 | -0.04 | 0.00 |
| 10/21/09 | 4.96 | 0.16 | -0.16 | 0.00 | 12/8/09 | 1.52 | 0.14 | -0.14 | 0.00 |
| 10/22/09 | 4.89 | 0.07 | -0.07 | 0.00 | 12/9/09 | 1.40 | 0.12 | -0.12 | 0.00 |
| 10/23/09 | 4.89 | 0.00 | 0.00 | 0.00 | 12/10/09 | 1.30 | 0.10 | -0.10 | 0.00 |
| 10/26/09 | 4.88 | 0.01 | -0.01 | 0.00 | 12/11/09 | 1.11 | 0.19 | -0.19 | 0.00 |
| 10/27/09 | 4.88 | 0.00 | 0.00 | 0.00 | 12/14/09 | 1.07 | 0.04 | -0.04 | 0.00 |
| 10/28/09 | 4.74 | 0.14 | -0.14 | 0.00 | 12/15/09 | 1.07 | 0.00 | 0.00 | 0.00 |
| 10/29/09 | 4.65 | 0.09 | -0.09 | 0.00 | 12/16/09 | 1.06 | 0.01 | -0.01 | 0.00 |
| 10/30/09 | 4.65 | 0.00 | 0.00 | 0.00 | 12/17/09 | 1.01 | 0.05 | -0.05 | 0.00 |
| 11/2/09 | 4.64 | 0.01 | -0.01 | 0.00 | 12/18/09 | 0.00 | 0.01 | -1.01 | -1.00 |
| 11/3/09 | 4.63 | 0.01 | -0.01 | 0.00 | Totals | | 5.42 | 6.42 | -1.00 |
| 11/4/09 | 4.27 | 0.36 | -0.36 | 0.00 | | | | | |

| | Index Value | Short Pays Dividend to Long | Daily MTM | Net | | Index Value | Short Pays Dividend to Long | Daily MTM | Net |
|---|---|---|---|---|---|---|---|---|---|
| 9/21/09 | 4.42 | | | | 11/5/09 | 2.15 | 0.12 | -0.12 | 0.00 |
| 9/22/09 | 4.39 | 0.03 | -0.03 | 0.00 | 11/6/09 | 2.01 | 0.14 | -0.14 | 0.00 |
| 9/23/09 | 4.38 | 0.01 | -0.01 | 0.00 | 11/9/09 | 1.74 | 0.27 | -0.27 | 0.00 |
| 9/24/09 | 4.24 | 0.14 | -0.14 | 0.00 | 11/10/09 | 1.46 | 0.28 | -0.28 | 0.00 |
| 9/25/09 | 4.24 | 0.00 | 0.00 | 0.00 | 11/11/09 | 1.46 | 0.00 | 0.00 | 0.00 |
| ... | | | | | ... | | | | |
| 10/12/09 | 3.25 | 0.00 | 0.00 | 0.00 | 11/27/09 | 0.06 | 0.26 | -0.26 | 0.00 |
| 10/13/09 | 3.18 | 0.07 | -0.07 | 0.00 | 11/30/09 | 0.00 | 0.11 | -0.06 | 0.05 |
| 10/14/09 | 3.14 | 0.04 | -0.04 | 0.00 | 12/1/09 | 0.00 | 0.05 | 0.00 | 0.05 |
| 10/15/09 | 3.14 | 0.00 | 0.00 | 0.00 | 12/2/09 | 0.00 | 0.15 | 0.00 | 0.15 |
| 10/16/09 | 3.14 | 0.00 | 0.00 | 0.00 | 12/3/09 | 0.00 | 0.04 | 0.00 | 0.04 |
| 10/19/09 | 3.14 | 0.00 | 0.00 | 0.00 | 12/4/09 | 0.00 | 0.01 | 0.00 | 0.01 |
| 10/20/09 | 3.12 | 0.02 | -0.02 | 0.00 | 12/7/09 | 0.00 | 0.04 | 0.00 | 0.04 |
| 10/21/09 | 2.96 | 0.16 | -0.16 | 0.00 | 12/8/09 | 0.00 | 0.14 | 0.00 | 0.14 |
| 10/22/09 | 2.89 | 0.07 | -0.07 | 0.00 | 12/9/09 | 0.00 | 0.12 | 0.00 | 0.12 |
| 10/23/09 | 2.89 | 0.00 | 0.00 | 0.00 | 12/10/09 | 0.00 | 0.10 | 0.00 | 0.10 |
| 10/26/09 | 2.88 | 0.01 | -0.01 | 0.00 | 12/11/09 | 0.00 | 0.19 | 0.00 | 0.19 |
| 10/27/09 | 2.88 | 0.00 | 0.00 | 0.00 | 12/14/09 | 0.00 | 0.04 | 0.00 | 0.04 |
| 10/28/09 | 2.74 | 0.14 | -0.14 | 0.00 | 12/15/09 | 0.00 | 0.00 | 0.00 | 0.00 |
| 10/29/09 | 2.65 | 0.09 | -0.09 | 0.00 | 12/16/09 | 0.00 | 0.01 | 0.00 | 0.01 |
| 10/30/09 | 2.65 | 0.00 | 0.00 | 0.00 | 12/17/09 | 0.00 | 0.05 | 0.00 | 0.05 |
| 11/2/09 | 2.64 | 0.01 | -0.01 | 0.00 | 12/18/09 | 0.00 | 0.01 | 0.00 | 0.01 |
| 11/3/09 | 2.63 | 0.01 | -0.01 | 0.00 | Totals | | 5.42 | -4.42 | 1.00 |
| 11/4/09 | 2.27 | 0.36 | -0.36 | 0.00 | | | | | |

SYSTEMS AND METHODS FOR USING DECLINING BALANCE METHODOLOGIES TO ENHANCE CLEARING OF DIVIDEND FUTURES AND OTHER INSTRUMENTS

TECHNICAL FIELD

The disclosure relates to the clearing of financial instruments. More particularly, the disclosure relates to clearing financial instruments associated with a declining balance methodology.

BACKGROUND

Cumulative total indexes are known in the art. Cumulative total indexes are constructed as the summation of a series of financial values, or values of economic significance, observed over a specified time period. Examples of cumulative total indexes include the indexes that underlie various current or historical futures contracts. Dividend index contracts, as currently offered on EUREX, are constructed as the cumulative total of dividends accrued by the stocks that comprise a stock index. CME heating degree days (HDD) and cooling degree days (CDD) futures are settled against indexes that cumulate temperature readings over a specified period. Fed Fund futures traded at CME are based upon the arithmetic average effective overnight Fed Funds rate observed in the marketplace. Since the arithmetic average is equivalent to the sum total of the observed values divided by the number of observations, the latter being a predetermined number, the contract is effectively based on the cumulated sum. Reference to a cumulative index of ex post values may tend to obfuscate the economic variable that is being traded.

In addition, weather futures contracts are known in the art. Such weather derivatives make weather a tradable commodity. Therefore, allowing particular risks related to the temperature and other forces of nature to be managed and hopefully mitigated. The Chicago Mercantile Exchange (CME) offers exchange-traded weather derivatives that are standardized contracts traded publicly on the open market and reflect, through specific indexes, monthly and seasonal average temperature in over a dozen U.S. and European cities.

BRIEF SUMMARY

The present disclosure overcomes problems and limitations of the prior art by disclosing systems and method for clearing a financial instrument (e.g., a futures contract) administered with a declining balance methodology (DBM). The system, in some embodiments, determines an accrued amount for each elapsed interval of time (e.g., daily) and reduces a settlement price of the financial instrument by the accrued amount. The accrued amount, in some examples, may include a reported amount (e.g., dividend) associated with the financial instrument. The system may also transfer funds between the holder of positions in the financial instrument based on a function of the accrued amount calculated at each interval.

An embodiment may include a method for clearing a futures contract associated with a declining balance methodology (DBM). The method includes receiving orders for a futures contract associated with a DBM, matching a sell order for the futures contract with a buy order for the futures contract at the remaining portion of the cumulative sum that has yet to be realized or resolved, determining an accrued amount (e.g., a reported amount associated with the DBM, such as a dividend for one company or a group of companies) for an elapsed interval of time (e.g., one day), reducing the daily settlement price of the futures contract by the accrued amount, and causing an offsetting transfer of funds from the short position holder to the holder of the long positions. The transfer of funds between the holders may be a function of the accrued amount. The adjustment pursuant to the DBM may be published by an exchange to track prospective values of a cumulated time series.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description and drawings and from the claims.

BRIEF DESCRIPTION OF THE DRAWINGS

The various aspects of the invention are illustrated by way of example and not limited in the accompanying figures in which like reference numerals indicate similar elements and in which:

FIG. 5 and FIG. 6 illustrate a series of actions, price updates, and cash flows associated with a financial instrument in accordance with various aspects of the invention.

DETAILED DESCRIPTION

Financial and economic indices may be constructed in many different ways. Aspects of the disclosure describe a declining balance methodology (DBM) that may be referenced as a quoting and/or accounting basis for financial instruments (e.g., derivative, options, futures, and forward contracts) in various product sectors. Aspects of the disclosure overcome problems and limitations of the prior art by disclosing systems and method for quoting, adjusting and settling futures contracts by successively removing the just-realized variables from the quoted futures price to focus the quoted contract value to the remaining unrealized economic variables. Further, such systems and method for quoting, adjusting and settling the futures contracts will preserve the underlying economic consideration for the trade when compared with the traditional way of quoting futures based on the same cumulative sum.

Aspects of the disclosure represent a method of successive adjustments of daily settlement prices and administration of cash payment pass-through for contracts with values based on a cumulated time series of economic variables, e.g. dividend accrual, temperatures, etc. By the successive adjustments, the system causes the financial instruments to behave as if it is pricing in forward-looking components of the cumulative time series. The realized portion of the cumulative time series will have no further effects to the future pricing of the instruments, as the economic value of such portion will have been fully reflected on the course of the successive adjustments.

Systems and method are disclosed for administering the declining balance methodology (DBM) by successively adjusting the (daily) settlement price of the futures contract based on a cumulated sum, and administering a cash payment or adjustment to reflect the value of the current realization of the cumulant. This cash payment or adjustment will offset in part or all of the mark-to-market variation caused by the adjustment to the daily settlement price of the contract. As such, the price of the contract will thus continue to reflect the portion of the cumulated sum that has yet to be realized or determined. At the expiration of the contract, the final mark-to-market variation will be set at zero, for the aforementioned purpose, thereby causing the total mark-to-market variation to add up to the original trade price, while the total cash payment to total realized cumulated sum. In doing so, the original economics of the futures trade is achieved and remained unaltered while the quoting mechanism will focus on the remaining undetermined portion of the cumulative sum—thereby removing irrelevant information from obscuring the economic value of the contract.

Figure 1:
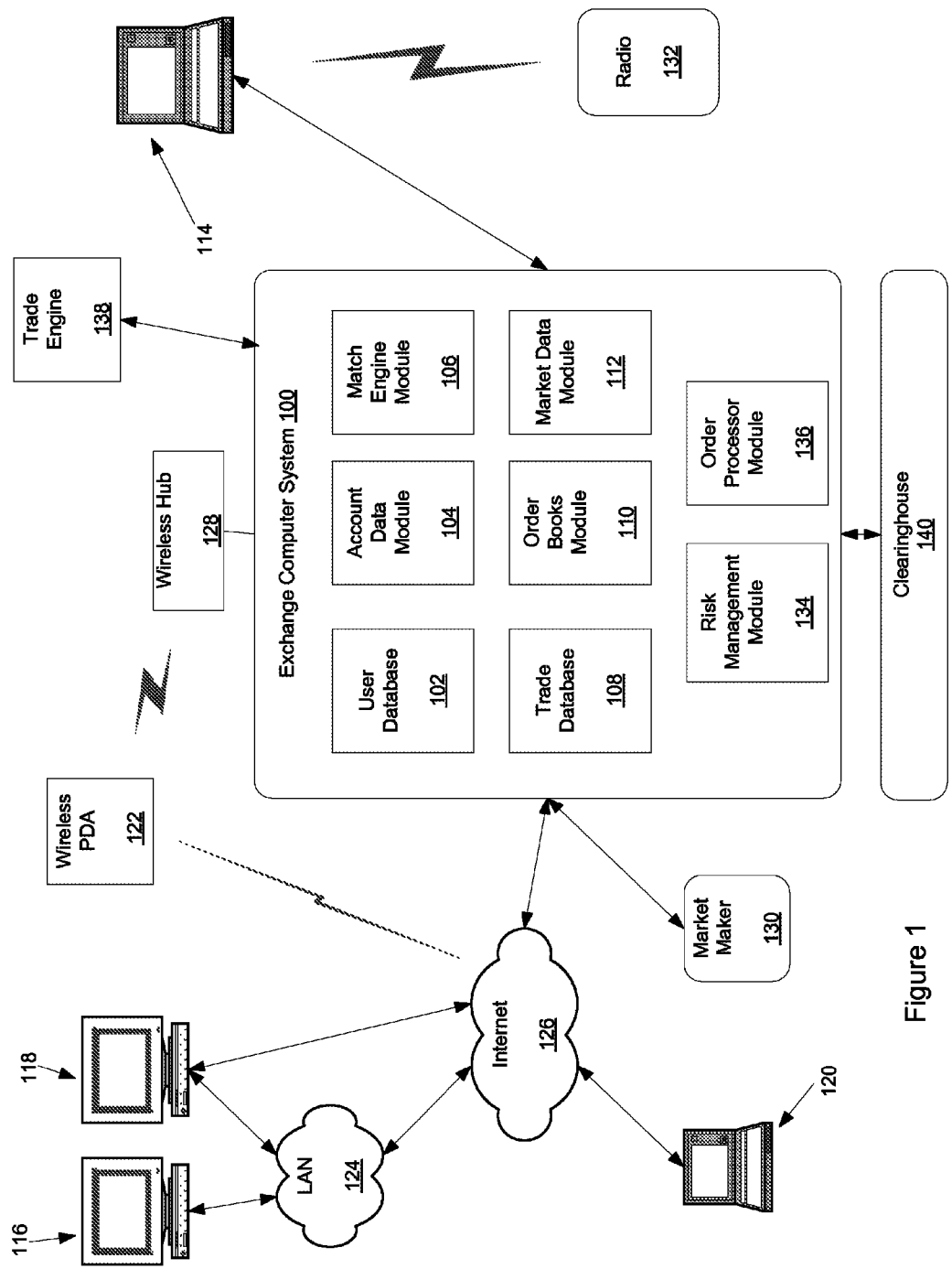
FIG. 1 illustrates a computer network system that may be used to implement aspects of the invention.

FIG. 1 depicts an illustrative operating environment that may be used to implement various aspects of the invention. The operating environment is only one example of a suitable operating environment and is not intended to suggest any limitation as to the scope of use or functionality of the invention. Aspects of the present invention are preferably implemented with computing devices and networks for exchanging, transmitting communicating, administering, managing and facilitating trading information including, but not limited to performance bond amount requirements and trading information. An exchange computer system 100 receives market data, analyzes historical data, calculates, and disseminates various values, e.g., accrued amounts associated with the declining balance methodology, historical accrual amounts, daily settlement price adjustments, cash payment etc., in accordance with aspects of the invention.

Exchange computer system 100 may be implemented with one or more mainframes, servers, gateways, controllers, desktops or other computers. The exchange computer system 100 may include one or more modules, processors, databases, mainframes, desktops, notebooks, tablet PCs, handhelds, personal digital assistants, smartphones, gateways, and/or other components, such as those illustrated in FIG. 1. Moreover, computer system 100 may include one or more processors (e.g., Intel® microprocessor, AMD®, microprocessor, risk processor, etc.) and one or more memories (e.g., solid state, DRAM, SRAM, ROM, Flash, non-volatile memory, hard drive, registers, buffers, etc.) In addition, an electronic trading system 138, such as the Globex® trading system, may be associated with an exchange 100. In such an embodiment, the electronic trading system includes a combination of globally distributed computers, controllers, servers, networks, gateways, routers, databases, memory, and other electronic data processing and routing devices. The trading system may include a trading system interface having devices configured to route incoming messages to an appropriate devices associated with the trading system. The trading system interface may include computers, controllers, networks, gateways, routers and other electronic data processing and routing devices. Orders that are placed with or submitted to the trading system are received at the trading system interface. The trading system interface routes the order to an appropriate device. A trading engine computer system 100 receives orders and transmits market data related to orders and trades to users.

A user database 102 may include information identifying traders and other users of exchange computer system 100. Such information may include user names and passwords. A trader operating an electronic device (e.g., computer devices 114, 116, 118, 120 and 122) interacting with the exchange 100 may be authenticated against user names and passwords stored in the user database 112. Furthermore, an account data module 104 may process account information that may be used during trades. The account information may be specific to the particular trader (or user) of an electronic device interacting with the exchange 100.

A match engine module 106 may match bid and offer prices for orders configured in accordance with aspects of the invention. Match engine module 106 may be implemented with software that executes one or more algorithms for matching bids and offers for financial instruments in accordance with aspects of the invention. The match engine module 106 and trading system interface may be separate and distinct modules or component or may be unitary parts. Match engine module may be configured to match orders submitted to the trading system. The match engine module may match orders according to currently known or later developed trade matching practices and processes. In an embodiment, bids and orders are matched on price, on a FIFO basis. The matching algorithm also may match orders on a pro-rata basis or combination of FIFO and pro rata basis. Other processes and/or matching processes may also be employed.

Moreover, a trade database 108 may be included to store historical information identifying trades and descriptions of trades. In particular, a trade database may store information identifying or associated with the time that an order was executed and the contract price. The trade database 108 may also comprise a storage device configured to store at least part of the orders submitted by electronic devices operated by traders (and/or other users). A confirmation message may be sent when the match engine module 106 finds a match for an order and the order is subsequently executed. The confirmation message may, in some embodiments, be an e-mail message to a trader, an electronic notification in one of various formats, or any other form of generating a notification of an order execution.

Furthermore, an order book module 110 may be included to compute or otherwise determine current bid and offer prices. The order book module 110 may be configured to calculate the price of a financial instrument. A risk management module 134 may be included in computer system 100 to compute and determine the amount of risk associated with a financial product or portfolio of financial products. An order processor module 136 may be included to receive data associated with an order for a financial instrument. The module 136 may decompose delta based and bulk order types for processing by order book module 110 and match engine module 106. The order processor module 136 may be configured to process the data associated with the orders for financial instruments.

In addition, a market data module 112 may be included to collect market data and prepare the data for transmission to users. In one embodiment, the market data module 112 may publish the value of the current accrual amount, and/or the daily settlement price adjustment amount, and/or the cash payment amount. The market data module 112 may regularly disseminate updates to the index, including updates to the index that may occur as values being tracked by the index (e.g., dividend announcements) are reported. In some embodiments in accordance with aspects of the invention, the market data module 112 may update the index on a daily basis (e.g., at the end of each trading day).

The trading network environment shown in FIG. 1 includes computer (i.e., electronic) devices 114, 116, 118, 120 and 122. The computer devices 114, 116, 118, 120 and 122 may include one or more processors, or controllers, that control the overall operation of the computer. The computer devices 114, 116, 118, 120 and 122 may include one or more system buses that connect the processor to one or more components, such as a network card or modem. The computer devices 114, 116, 118, 120 and 122 may also include interface units and drives for reading and writing data or files. Depending on the type of computer device, a user can interact with the computer with a keyboard, pointing device, microphone, pen device or other input device. For example the electronic device may be a personal computer, laptop or handheld computer, tablet pc and like computing devices having a user interface. The electronic device may be a dedicated function device such as personal communications device, a portable or desktop telephone, a personal digital assistant ("PDA"), remote control device, personal digital media system and similar electronic devices.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a local area network (LAN) 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

The operations of computer devices and systems shown in FIG. 1 may be controlled by computer-executable instructions stored on computer-readable storage medium. Embodiments also may take the form of electronic hardware, computer software, firmware, including object and/or source code, and/or combinations thereof. Embodiment may be stored on computer-readable media installed on, deployed by, resident on, invoked by and/or used by one or more data processors (e.g., risk processor), controllers, computers, clients, servers, gateways, networks of computers, and/or any combinations thereof. The computers, servers, gateways, may have one or more controllers configured to execute instructions embodied as computer software. For example, computer device 120 may include computer-executable instructions for receiving updated settlement prices, accrued amounts, and other information from computer system 100 and displaying to a user. In another example, computer device 118 may include computer-executable instructions for receiving market data from computer system 100 and displaying that information to a user. In yet another example, a processor of computer system 100 may be configured to execute computer-executable instructions that cause the system 100 to calculate a performance bond amount required to balance risk associated with a portfolio of financial instruments administered with a declining balance methodology.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems, such as clearinghouse 140. Coupling can be direct as described or any other method described herein.

A clearinghouse 140 enables an exchange computer system 100 to provide contracts with mutualized risk of counterparty credit risk than over-the-counter (OTC) products. A clearinghouse 140 arranges for transactions to be settled and cleared. Clearing is the procedure through which a clearinghouse 140 becomes buyer to each seller of a contract (e.g., futures contract, equities, currencies, interest rate products, etc.), and seller to each buyer, and assumes responsibility for protecting buyer and seller from financial loss by assuring performance on each contract. A clearinghouse 140 may settle trading accounts, clear trades, collect and maintain performance bond funds, regulate delivery and report trading data. In some scenarios an exchange may operate its own clearinghouse 140 through a division of the exchange through which all trades made are confirmed, matched, and settled each day until offset or delivered. In other words, the exchange computer system 100 may be internal to the clearinghouse 140. Alternatively, one or more other companies may be provided the responsibility of acting as a clearinghouse 140 with the exchange (and possibly other exchanges). An exchange may have one or more clearinghouses associated with the exchange. An exchange may offer firms qualified to clear trades to provide a clearinghouse 140 for the exchange computer system 100. In some instances, these clearing members may be designated into different categories based on the type of commodities they can clear and other factors.

The clearinghouse 140 may establish minimum performance bond (i.e., margin) requirements for the products it handles. A customer may be required to deposit a performance bond with the clearinghouse 140 (or designated account) for the purpose of insuring the clearinghouse 140 against loss on open positions. The performance bond helps ensure the financial integrity of brokers, clearinghouses, and exchanges as a whole. If a trader experiences a drop in funds below a minimum requirement, the clearinghouse 140 may issue a margin call requiring a deposit into the margin account to restore the trader's equity. A clearinghouse 140 may charge additional performance bond requirements at the clearinghouse's discretion. For example, if a clearinghouse's potential market exposure grows large relative to the financial resources available to support those exposures, the clearinghouse 140 may issue a margin call.

In another embodiment, the clearinghouse 140 may require a larger performance bond based on a credit check (e.g., an analysis of the credit worthiness, such as using a FICO™ or comparable score, inter alia) of the customer/trader. The credit check may be performed (i.e., initiated) by a clearinghouse 140 or an exchange 100. In the example where the clearinghouse 140 performs the credit check, the clearinghouse 140 may send a message (e.g., enforcement message)

to the exchange 100. If the credit check indicates that a customer/trader is a high risk, the enforcement message may increase the margin requirements of the customer/trader, or otherwise adjust the capabilities/constraints of the customer/trader commensurate with the higher risk. In the example where the exchange 100 initiates the credit check, the exchange 100 may send a message to one or more clearinghouses associated with the exchange 100 to update them on the increased/decreased risk associated with the customer/trader.

In recognition of the desire to promote efficient clearing procedures and to focus on the true intermarket risk exposure of clearinghouses, a cross-margining system may be used. By combining the positions of joint and affiliated clearinghouses in certain broad-based equity index futures and options into a single portfolio, a single performance bond requirement across all markets may be determined. The cross-margining system may greatly enhance the efficiency and financial integrity of the clearing system.

The principal means by which a clearinghouse 140 mitigates the likelihood of default is through mark-to-market (MTM) adjustments. The clearinghouse 140 derives its financial stability in large part by removing debt obligations among market participants as they occur. Through daily MTM adjustments, every contract is debited or credited based on that trading session's gains or losses. For example, as prices move for or against a position, funds flow into or out of the trading account. This cash flow is known as settlement variation.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
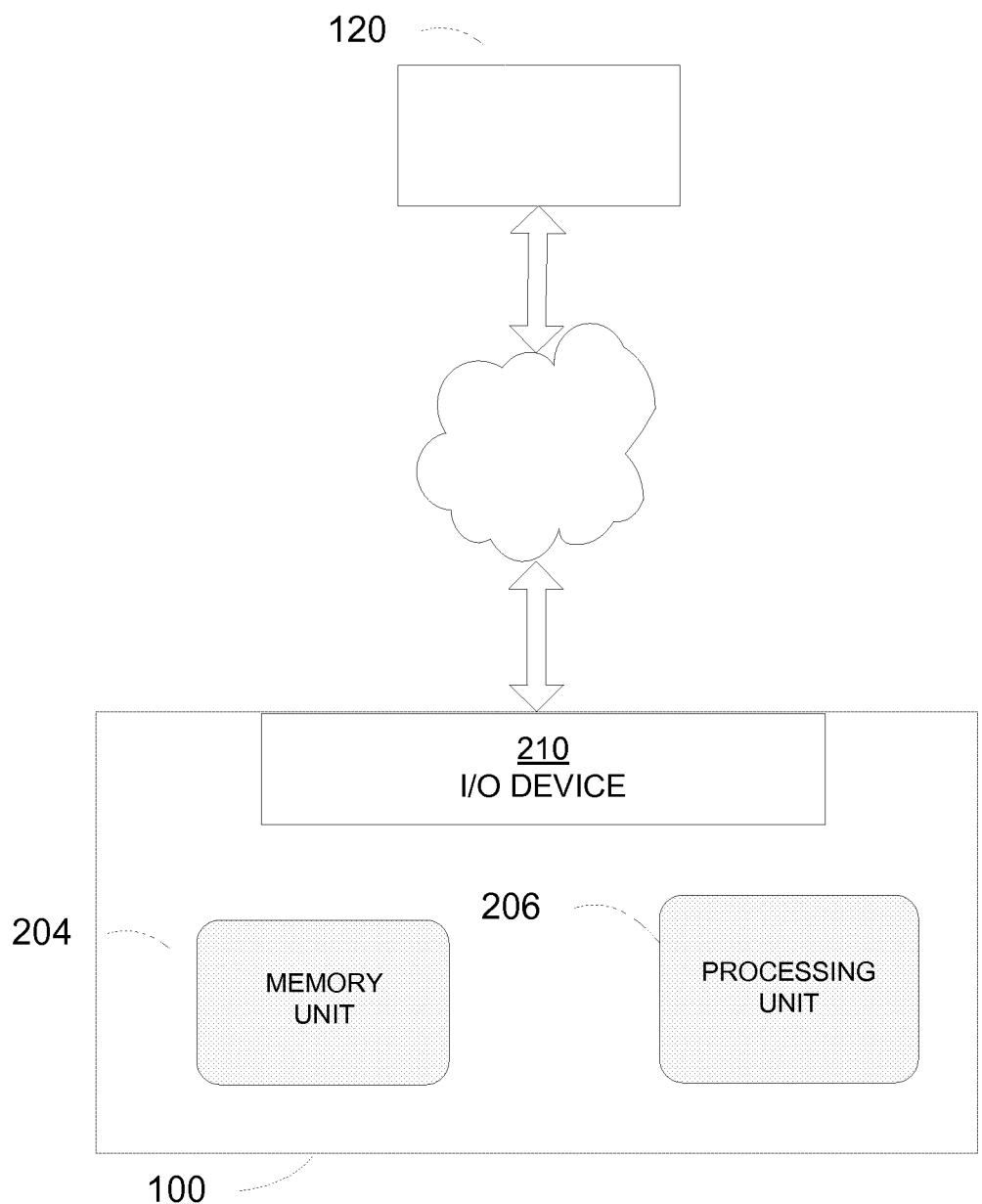
FIG. 2 illustrates a high-level diagram of a computer system that may be used to implement aspects of the invention.

FIG. 2 is an example of a suitable operating environment in which various aspects of the invention may be implemented. The operating environment is only one example of a suitable operating environment and is not intended to suggest any limitation as to the scope of use or functionality of the invention. The processing unit 206 (e.g., Intel® processor) of computer system 100 executes computer-executable instructions in accordance with aspects of the invention. Memory unit 204 may store computer-executable instructions, which are executed by the computer system 100. The computer-executable instructions may be comprised of modules in accordance with aspects of the invention.

The computer system 100 may have one or more input/output devices/interfaces 210 (e.g., keyboard, mouse, voice automation, screen, kiosk, handheld computing device display, voice, ethernet interface, modem interface, network interface, etc.) Computing device 120 may be a laptop computer, handheld computing device, or any other mobile computing device. In one embodiment in accordance with the invention, a user of computing device 208 can remotely communicate, through wired or wireless communication networks, to computer system 100 at a clearinghouse or exchange. The user may remotely enter orders for financial instruments offered by the exchange and indicate a bank account to pay margin requirements and receive cash flows resulting from market changes, dividends, etc.

Of course, numerous additional servers, computers, handheld devices, personal digital assistants, telephones and other devices may also be connected to exchange computer system 100. Moreover, one skilled in the art will appreciate that the topology shown in FIG. 2 is merely an example and that the components shown in FIG. 2 may be connected by numerous alternative topologies.

Figure 3:
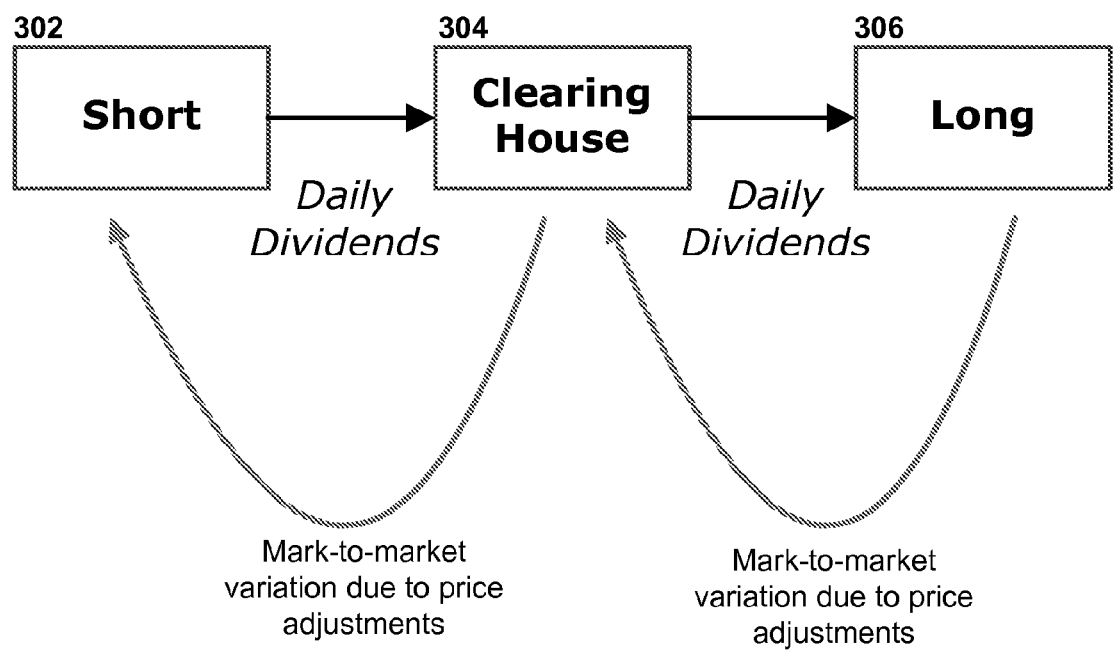
FIG. 3 illustrates a pass-through feature in accordance with various aspects of the invention.

FIG. 3 illustrates a relationship between a holder of a short position 302 in a financial instrument, a clearinghouse 304, and a holder of a long position 306 in the financial instrument. The financial instrument may be a futures contract subject to the declining balance methodology (DBM). The clearinghouse 304 may include a computer system 100 to, among other things, clear the financial instrument. The clearinghouse 304 may receive, through the exchange computer system 100, orders for the futures contracts subject to the DBM methodology (see FIG. 4, step 402).

In the embodiment where the contract is subject to a DBM, such as illustrated in FIG. 3, as dividend amounts are reported on a daily basis for an entity or entities associated with the index, funds from a holder of the short position 302 are transferred to the holder of the longer position 306. The amount of the transferred funds may equal the accrued dividend amount. The clearinghouse 304 may manage the financial accounts of the holders and facilitate transfer of the funds, in some embodiments. This transfer of funds based on the reported dividends may be referred to as "dividend passthrough" in this disclosure.

In some embodiments in accordance with aspects of the invention, the DBM may track prospective values of a cumulated time series and may be published (see FIG. 4, step 400), in some embodiments, through a market data module 112 of an exchange computer system 100. The market data module 112 may publish the current settlement price for a contract associated with the DBM. The DBM may account for the prospective remaining time series values yet to be observed, rather than past values that have been observed. The contract settlement price subsequently reduced by an amount equal to an observed value on a regular basis (e.g., daily) thereafter until the contract settlement price reaches a value of zero or less, or the contract expires.

The contract price may begin at a seeded initial value and decline to zero over a period of time. The seeded initial value may be selected, in some embodiments, arbitrarily by the publisher of an index associated with the DBM. In other embodiments, the seeded initial value may be established at an estimate of what the cumulated total value over the accumulation period might be, for example, by reference to historical cumulated values from past periods. In yet other embodiments, the initial seeded value may be set at the spot value at the date of creation of the futures contract.

Figure 4:
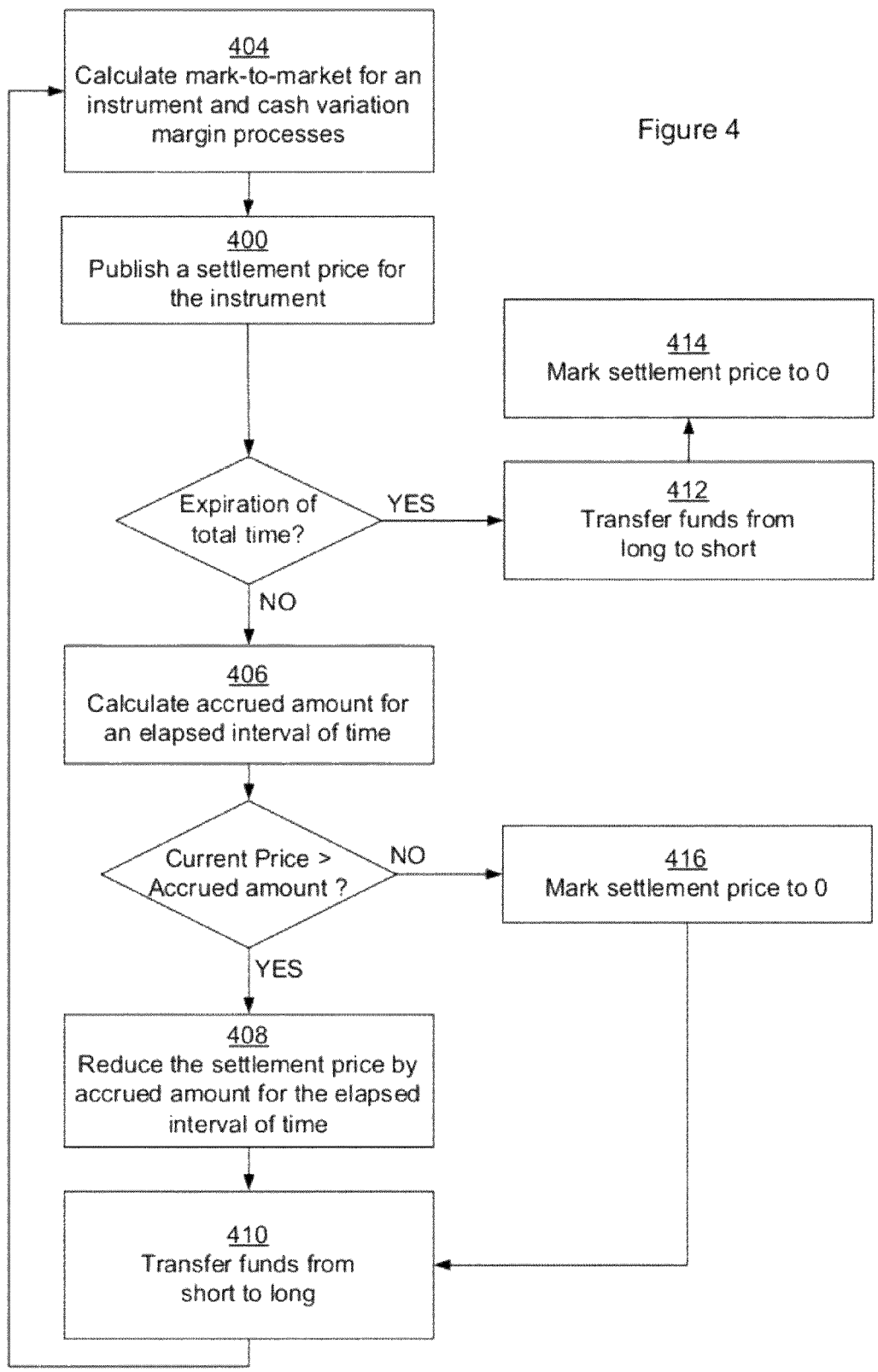
FIG. 4 illustrates a flowchart for an illustrative method of clearing futures contracts associated with a declining balance methodology in accordance with aspects of the invention.

Referring to FIG. 4, in accordance with aspects of the invention, an illustrative method is depicted for processing and clearing a financial instrument associated with a declining balance methodology (DBM). The method illustrated in FIG. 4 may be implemented using a computer system 100 configured to process and/or clear futures contracts or other financial instruments. The computer system 100 may be a system located at or in communication with a clearinghouse 304, such as one provided by the Chicago Mercantile Exchange.

In one example in accordance with various aspects of the disclosure, the sum total of dividends accrued to an S&P 500 index portfolio may be the underlying for a futures contract. This sum total may be expressed in terms of index points. For example, for a Standard & Poor (S&P) 500 index at about 1,000 points, assuming the total accumulation period is one year, a 2% dividend yield implies approximately 20 index points as the dividend accrual for a year. Thus, a futures contract based on the total accrual for a one-year period shall be priced at approximately 20 index points, with each index point worth a fixed number of currency (e.g., U.S. dollars). For example, assuming a market participant buys the futures contract at a price of 20 index points, then he will derive a profit if the total accrual during the 1-year period is above 20 index points and he holds the position until expiration. Conversely, if the realized accumulation falls below 20 index point by the expiration, he will derive a loss from the trade if he holds the position until expiration.

In accordance with various aspects of the invention, at any point following the start of the accumulation period, the dividends may begin to accrue. By way of contrast, if the futures contract is not designed pursuant to a DBM methodology in accordance with aspects of this disclosure, then the price of the contract will continue to reflect the accrual of dividends for the entire accumulation period. After the commencement of the accumulation period, dividend accruals, if any, may be calculated at the close of trading each day. As such, these accruals will factor into the final settlement price of the contract but do not contain any information that is not already determined and will no longer change. As such, the price of the futures contract will continue to reflect this stale information that has no economic purpose. The remaining uncertainty is the amount of dividends to be accrued between now and the expiration of the contract. Thus, the DBM methodology is designed to remove the previous accumulation information by a process that takes the stale information out from the price of the futures contract so that the price will reflect information that has yet to be revealed.

For example, assuming the total time has not expired (i.e., the financial instrument has not reached its settlement date), in step 406, for each elapsed interval of time (e.g., daily), the computer system 100 may calculate an accrued amount. The accrued amount may include the reported amount associated with the financial instrument associated with the DBM. For example, given a financial instrument that tracks dividends posted by companies in the S&P500, each day dividends posted by each company in index may be summed and reported as the accrued amount for that elapsed interval of time. One skilled in the art will appreciate that for purposes of this disclosure a dividend may be reported when the dividend is actually issued to shareholders, when it is announced by a company, or any other time when a dividend-related event occurs.

The computer system 100 may use this accrued amount for the elapsed interval of time to reduce the current price of the financial instrument. Assuming the current settlement price is greater than this accrued amount, in some embodiments, the contract price may be reduced (see step 408) by the amount of the accrued amount. Meanwhile, in alternate embodiments, the contract price may be reduced by a function of the accrued amount (e.g., by a predetermined percentage of the accrued amount, or according to a predetermined mapping between the accrued amount and the amount of reduction.)

Further, by eliminating the stale accumulation from the price of the futures contract, the market can be organized in an efficient manner. For example, assume that there are two dividend futures on the S&P 500 index. The first contract has an accumulation period of one year, e.g. from January to December. The second contract has an accumulation period of only six months, from July to December. Notice that the termination times of the accumulation for the two contracts are the same but the commencements of the periods are different. By way of contrast, if the contracts are not written in accordance with various aspects of the DBM methodology disclosed herein, the first contract may have a price of 20 index points while the latter may have a price of 10 index points. By July, however, the information pertaining to the accrual of the dividends from January through June will be trivial. It will be factored into the prices of the first contract but not the second contract. Meanwhile, the two contracts would remain distinct as they will have different terms, i.e. accumulation periods. In accordance with various aspects of the disclosure, by July, the former contract that originally covers one-year of accrual of dividend will have been adjusted in such a way that the price will reflect the value of the dividend accrual that remains undetermined (i.e., from July to December.) As such, by then, the original one-year dividend accrual contract is indistinguishable from the contract that was originally covering only from July to December.

In addition, in accordance with various aspects of the disclosure, adjustment of the daily settlement prices and the corresponding "side" cash payments work as follows. On each day, the clearinghouse may query the contract to determine whether the accumulation period has started. If the accumulation period of a contract has started, the clearinghouse may query the accrual amount for the day. By way of example, assuming the dividend futures contract is marked to a market price of 20 index points at the end of the day. The clearinghouse ascertains that the accrual amount for the day is 0.50 index points. The clearinghouse may: (i) adjust the mark-to-market price, and/or (ii) cause a "side" cash payment. The clearinghouse may adjust (see step 408) the mark-to-market price of 20 index points down by the accrual amount for the day, or from 20 index points to 19.50 index point. The clearinghouse would then perform a mark-to-market variation from the previous day. Thus, the adjustment of the daily mark-to-market price (or daily settlement price, hereafter used interchangeably) will represent an extra 0.50 index point in favor of the short position holder. Note that in this example the settlement price may never be adjusted below zero, reflecting the fact that the cumulants in the future cannot be negative. In addition, the clearinghouse will further cause a "side" payment of 0.50 index points, the amount of the current accrual, from short to long position holders (see step 410).

In step 410, a pass-through occurs where funds are caused to be transferred from the account of the holder of the short position to the account of the holder of the long position. The amount of funds transferred is based on the accrued amount. In one embodiment, the transferred funds are equal to the accrued amount. Meanwhile, in alternate embodiments, the transferred funds may be a function of the accrued amount (e.g., a predetermined percentage of the accrued amount, or according to a predetermined mapping between the accrued amount and the amount of transferred funds.) The computer system 100 may cause a financial institution to effect a transfer of funds (e.g., credit one account and debit another account) as described herein.

The net result of these two additional actions are two fold: (i) these two actions will offset each other on most days, i.e. long pays short extra 0.50 index points via mark-to-market while the short pays long 0.50 index point to reflect the daily accrual; thus if there is no change in the market forecast of the dividend paying pattern, the sum total of payment is zero; (ii) the price of the dividend futures will be adjusted down by 0.50 index points, reflecting the fact that the accumulation period is shortened. Previously accrued dividend information has already been settled and will have no further impact on the prices of the futures contract that is written pursuant to the DBM methodology in accordance with the disclosure.

In other words, the net effect of the reducing step (i.e., step 408) and the causing a transfer of funds step (i.e., step 410) is zero. It is the "pass-through" feature disclosed herein that offsets the settlement price linked to the financial instrument.

The pass-through is a regular, recurring (e.g., on a daily basis) transfer. In one embodiment, the daily pass-through represents a cash payment made on a daily basis from the account of the short to the account of the long held at the clearinghouse 304 in an amount equal to the observed values. As illustrated in FIG. 3, this pass-through occurs on a daily basis from the time the futures position is established until it is either offset or the contract reaches maturity and is cash settled. Thus, held until the futures contract's maturity, the short will pay and the long will receive pass-through payments that equal the total amount of dividends actually accrued over the period the position is held.

Continuing with the earlier example, at the expiration of the contract, the final value of the daily settlement is zero (see step 414). In doing so, the sum total of the adjustment of the daily settlement prices is the price originally entered into at the time of trade. Thus, if the long position is established at 20.00 index points, through this series of daily settlement adjustment, the total payment from long to short (see step 412) shall be 20.00 index points. On the other hand, the sum total of payments from short to long through the "side" cash payments each day will add up to the sum total of the daily accrual amount (since the time of trade, or the start of the accumulation period, whichever is later.) Therefore, these successive adjustments and "side" cash payments (or pass-throughs) will add up to the original economic terms of the trade. If the total accrual of the period were 21 index points, the net result is that the long position holder will gain 1 index point (pay 20 index points through daily adjustments, collect 21 index points through the side cash payments). This reflects the economic outcome desired when the trade is entered into.

In those scenarios where the settlement price of the contract is not greater than accrued amount for the elapsed interval of time, the settlement price is reduced to zero (see step 416), and the computer system 100 causes a transfer of funds (in step 410) from the holder of the short to the holder of the long. The transferred funds are equal to the difference between the settlement price and the accrued amount. For each subsequent interval of time until the expiration of the financial contract, the accrued amount may be transferred from the holder of the short to the holder of the long. In other words, if the settlement price reaches zero before the expiration of the financial instrument, then subsequently reported values result in a profit to the holder of the long position. The income stream to the long position concludes at the expiration of the financial instrument linked to the a declining balance methodology.

However, in some scenarios the settlement price may be greater than zero for all time intervals before the settlement date. In such a scenario, at the expiration of the total time of the financial instrument linked to the DBM, the computer system 100 may cause a one-time transfer of funds (see step 412) from the holder of the long order to the holder of the short order. The final transferred funds may be a function of the declining balance methodology. In some embodiments, the final transferred funds may be equal to the settlement price when the total time expires (i.e., time $t_{end}$). Then, in step 414, the final settlement price may be optionally set to zero. Once the financial instrument, the parties to the financial instrument will proceed to settle their positions and the instruments shall seize to have further effect.

FIGS. 5 and 6 provide examples in which illustrative accrual values and prices of the prospective futures contracts are provided in an illustrative example. In both figures, when the accrued dividends exceed the original trade price or when the accrued dividends fall below the original trade price, the eventual gains and losses reflect the original economics of the trade while the quoted prices throughout the period continues to track the then-remaining undetermined dividend amounts.

Referring to FIG. 5, that figure illustrates a series of actions, updates, and "pass-throughs" associated with a financial instrument linked to a DBM in accordance with various aspects of the invention. Assume that the financial instrument of FIG. 5 is a futures contract based upon the quarterly dividends associated with the 500 constituents included in the S&P 500 stock index. The futures contract is valued at $2,500 times the index. The cumulative period extends over the course of a quarter from September 21 to December 18. The index is seeded an initial value of 6.42 (see FIG. 5, ref. 502). Over the course of the quarter, the computer system 100 determines accrued dividend amounts for each of the elapsed intervals of time totaling 5.42 index points (i.e., $13,550=$2,500 times 5.42). This value is received over the course of the quarter by the long from the short as a result of the daily dividend pass-through. In various embodiments in accordance with aspects of the disclosure, the daily mark-to-market (MTM) facilities of a clearinghouse 304 may be used to calculate and update the daily declines. However, the final settlement price is marked to equal zero on the final settlement day (i.e., $t_{end}$) of December 18 (see FIG. 5, ref. 504). Thus, the cumulative mark-to-market represents a loss of 6.42 index points (or $16,050=$2,500 times 6.42) over the course of the quarter as illustrated in FIG. 5. Therefore, the account of the long position profits at settlement in the amount of $2,500 (i.e., $2,500 times 1.0).

Referring to FIG. 6, that figure illustrates a series of actions, updates, and "pass-throughs" associated with a financial instrument linked to a DBM in accordance with various aspects of the invention. Assume that the financial instrument of FIG. 6 is a futures contract based upon the quarterly dividends associated with the 500 constituents included in the S&P 500 stock index. The futures contract is valued at $2,500 times the index. The cumulative period extends over the course of a quarter from September 21 to December 18. The index is seeded an initial value of 4.42 (see FIG. 6, ref. 602). Over the course of the quarter, the computer system 100 determined accrued dividend amounts for each of the elapsed interval of time totaling 5.42 index points (i.e., $13,550=$2,500 times 5.42). This value is received by the long from the short as a result of regular (e.g., daily) dividend pass-through.

However, in the example of FIG. 6, the settlement price of the financial instrument reaches zero by November 30 (see ref. 604), well before the final settlement date of December 18. In other words, the initial seed value of 4.42 underestimated the dividends that would actually accrue over the course of the quarter. From September 21 to November 30, the holders of the long position received 5.42 index points through the daily dividend pass-through process, but lost the equivalent of 4.42 index points through the daily accumulated mark-to-market (MTM) for the contract. During the time period from November 30 until December 18, the long position earned the equivalent of 1.0 index points through MTM. As a result, the long position earned an overall net profit of $2,500 (i.e., $2,500 times 1.0 index points) on the contract. Meanwhile, the short position incurred a loss of $2,500 (i.e., 1.0 index points). One skilled in the art will appreciate that the actual net profits may be lower after any commissions and/or fees are collected by, for example, the clearinghouse 304 and/or other organizations.

While there may be myriad applications for a declining balance methodology (DBM), numerous examples in this disclosure describe the administration of a DBM-linked futures contract for purposes of illustration. In accordance with various aspects of the disclosure, such a financial instrument may be deployed as the basis for a cash-settled derivatives contract. That index-linked derivative contract may be constructed in the form of a futures contract, a derivative contract, an over-the-counter (OTC) swap, as the basis for a cash-settled option, or as an option on an index-linked futures contract. Analogous processes may be deployed in the context of other derivatives contracts.

In addition, a declining balance dividend index (DBDI) futures contract can provide a useful price discovery function to the extent that stock index futures traders typically quote dividend streams in terms of the expected ex post dividends to be accrued until futures contract maturity. Such a futures contract facilitates the activities of traders who wish to gain risk exposure to dividend streams. If a trader expects that future dividend payments will exceed the value at which futures are trading, then she may wish to buy futures. If she believes that future dividend payments will be less than the value at which futures are trading, then she may sell the futures. As a result, such a futures contract will generally be traded at levels that reflect the market's aggregate expectations regarding the remaining values to be deducted from the spot index.

Declining balance dividend index futures would represent a useful tool for arbitrageurs. The clearinghouse 304 may assist in trading, clearing, etc. a futures contract tracking the index. Such a contract may permit traders to hedge against risks associated with an attribute of an asset (e.g., an equity, a stock, a commodity, etc.) Thus, the futures contract may be useful for price discovery, for taking a position on the financial or economic number represented in the index, or for purposes of cash/futures arbitrage activity. For example, a declining balance dividend index futures contract may be useful to arbitrageurs who take counteracting positions in stock index futures versus baskets of stocks represented in the index in question. A cash stock position entails the receipt (long stock position) or implicit payment (short stock position) of dividends; likewise, stock index futures reflect expected stock dividend streams. Opinions regarding future dividend streams vary and arbitrageurs commonly study and predict corporate dividend patterns.

Aspects of the disclosure have potential applications in many different prospective market sectors. For example, a stock index dividend product (e.g., stock dividend derivatives) may be created in accordance with various aspects of the disclosure. The disclosure may be applied broadly in creating any financial or economic index using the herein described declining balance methodology. In particular, the methodology advantageously creates transparency by quoting the remaining value instead of largely irrelevant cumulative past values of an index. For example, the declining balance methodology may be used with weather contracts, where the reported amount is a function of a measurement of the sum of daily temperature readings (e.g., daily high temperature, daily low temperature, etc.) expected for a period of time in a predetermined geographic area. Such an instrument may be especially useful to traders dealing with futures contracts involving agricultural products (e.g., corn, wheat, etc.)

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. For example, aspects of the invention are not limited to implementations that involve the trading of derivative products. Embodiments of the present invention can be extended for any market, future, option, forward or other financial instrument, investment vehicle, or equity product. Those skilled in the art will appreciate that aspects of the invention may be used in other markets, such as weather index futures markets, for example, to manage risk parameters.

We claim:

1. A computer-implemented method for clearing a futures contract comprising:
   determining, by an exchange computer system, an accrued amount of reported dividends associated with the futures contract for an elapsed interval of time, where the accrued amount includes a reported amount associated with the futures contract;
   reducing, by the exchange computer system, a settlement price of the futures contract by the accrued amount; and
   causing, by the exchange computer system, a transfer of funds from a holder of a short position to a holder of a long position, where the transferred funds are a function of the accrued amount.

2. The method of claim 1, where the reported amount is an amount of dividend reported by a predetermined entity during the elapsed interval of time.

3. The method of claim 1, where the reported amount is an amount of total dividends reported by each entity in a predetermined group of entities during the elapsed interval of time.

4. The method of claim 1 further comprising:
   publishing, by a market data module of the exchange computer system, the settlement price of the futures contract reduced by the accrued amount, where the settlement price tracks prospective values of a cumulated time series, and the settlement price is zero at expiration of the futures contract.

5. The method of claim 1, where the value of the futures contract tracks an estimated total amount of reported amounts to be accrued for a remainder of the period until expiration of the futures contract.

6. The method of claim 1, where the transferred funds are equal to the accrued amount.

7. The method of claim 6, where a net effect of the reducing step and the causing a transfer step on accounts of a holder of the futures contracts is zero.

8. The method of claim 1, where the settlement price prior to the reducing step is not greater than the accrued amount for the elapsed interval of time, and the transferred funds are a difference between the settlement price and the accrued amount, the method further comprising:
   setting the settlement price to zero.

9. The method of claim 1, further comprising:
   determining that the futures contract has reached a final settlement date;
   causing, by the exchange computer system, a final transfer of funds from the holder of the long position to the holder of the short position, where the final transferred funds are a function of the settlement price; and
   setting the settlement price to zero.

10. The method of claim 9, where the final transferred funds are equal to the settlement price prior to the step of setting the settlement price to zero.

11. The method of claim 1, where the futures contract is a weather contract, and the reported amount is a function of a measurement of daily temperature readings of a predetermined geographic area.

12. The method of claim 1, where the futures contract comprises one of an over-the-counter swap, and an option.

13. The method of claim 1, where the elapsed interval of time is one day.

14. A computerized method for managing a financial instrument,
where the financial instrument expires at time $t_{end}$, the method comprising:
determining, at an exchange computer system, an accrued amount of reported dividends associated with the financial instrument for an elapsed interval of time, where the accrued amount includes an amount reported about an attribute of the financial instrument;
reducing, by the exchange computer system, the settlement price of the financial instrument by the accrued amount;
causing, by the exchange computer system, a transfer of funds from a holder of a short position in the financial instrument to a holder of a long position in the financial instrument, where the transferred funds are a function of the accrued amount;
determining that a current time is at or after time $t_{end}$, and the settlement price is greater than zero; and
when the current time is at or after time $t_{end}$, and the settlement price is greater than zero, causing, by the exchange computer system, a final transfer of funds from the holder of the long position to the holder of the short position, where the final transferred funds are a function of an accrued amount at a final interval of time.

15. The method of claim 14, further comprising:
setting the settlement price to zero;
crediting the holder of the short position by the amount of the final transferred funds; and
debiting the holder of the long position by the amount of the final transferred funds.

16. The method of claim 14, where the attribute of the financial instrument is a dividend reported by a predetermined entity during the elapsed interval of time.

17. The method of claim 14, where the value of the financial instrument tracks prospective values of a cumulated time series, and the settlement price is zero after time $t_{end}$.

18. A memory apparatus storing computer-executable instructions that, when executed by a processor of a computer, cause the computer to perform a method comprising:
calculating an accrued dividend amount associated with the financial instrument for an elapsed interval of time, where the accrued dividend amount is a sum of dividend amounts reported by entities associated with a futures contract during the elapsed interval of time;
reducing a settlement price of the futures contract by a function of the accrued dividend amount; and
causing a transfer of funds from a holder of a short position in the futures contract to a holder of a long position in the futures contract, where the transferred funds are a function of the reduction in the settlement price of the futures contract.

19. The memory apparatus of claim 18, where the settlement price is zero at a final settlement date of the futures contract.

20. The memory apparatus of claim 18, the method further comprising:
determining that the futures contract has expired;
setting the settlement price to zero; and
causing a final transfer of funds from the holder of the long order to the holder of the short order, where the final transferred funds are equal to the settlement price.

* * * * *